(12) United States Patent
Minagawa et al.

(10) Patent No.: US 12,473,455 B2
(45) Date of Patent: *Nov. 18, 2025

(54) POLYMER-COATED SUBSTRATE AND MEDICAL ANALYSIS DEVICE

(71) Applicant: SUMITOMO RUBBER INDUSTRIES, LTD., Kobe (JP)

(72) Inventors: Yasuhisa Minagawa, Kobe (JP); Mitsuko Takii, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 391 days.

This patent is subject to a terminal disclaimer.

(21) Appl. No.: 18/116,599

(22) Filed: Mar. 2, 2023

(65) Prior Publication Data

US 2023/0357597 A1 Nov. 9, 2023

(30) Foreign Application Priority Data

Mar. 31, 2022 (JP) ................. 2022-059545

(51) Int. Cl.
*C09D 183/06* (2006.01)
*C09D 4/00* (2006.01)
*C09D 133/08* (2006.01)

(52) U.S. Cl.
CPC ............. *C09D 183/06* (2013.01); *C09D 4/00* (2013.01); *C09D 133/08* (2013.01)

(58) Field of Classification Search
CPC ...... C09D 183/06; C09D 4/00; C09D 133/08; C09D 133/14; C09D 183/02; C03C 17/30; C03C 17/324; C03C 17/3405; C03C 17/004; C08F 120/28; G01N 33/54393; G01N 33/574

See application file for complete search history.

(56) References Cited

U.S. PATENT DOCUMENTS

| | | | | |
|---|---|---|---|---|
| 4,304,802 A | * | 12/1981 | Mosse | B65D 23/0814 |
| | | | | 427/407.1 |
| 2012/0015440 A1 | | 1/2012 | Otsuka et al. | |
| 2018/0230045 A1 | | 8/2018 | Ohkawa | |
| 2019/0233555 A1 | | 8/2019 | Minagawa et al. | |
| 2019/0250149 A1 | | 8/2019 | Minagawa et al. | |
| 2019/0250150 A1 | | 8/2019 | Minagawa et al. | |
| 2019/0250151 A1 | | 8/2019 | Minagawa et al. | |

(Continued)

FOREIGN PATENT DOCUMENTS

| | | | |
|---|---|---|---|
| EP | 2258780 A1 * | 12/2010 | ............... B05D 7/54 |
| EP | 3 670 463 A1 | 6/2020 | |

(Continued)

OTHER PUBLICATIONS

Silane Coupling Agents (Year: 2017).*

*Primary Examiner* — Pamela H Weiss
(74) *Attorney, Agent, or Firm* — Birch, Stewart, Kolasch & Birch, LLP (57) ABSTRACT

Provided are a polymer-coated substrate in which a polymer layer formed on the surface of a substrate is stable for a long period of time even in a liquid environment, and a medical analysis device including the polymer-coated substrate. Included is a polymer-coated substrate which includes a substrate, a silane compound layer formed on a surface of the substrate, and a polymer layer formed on the silane compound layer.

6 Claims, 3 Drawing Sheets

(56) References Cited

U.S. PATENT DOCUMENTS

| | | |
|---|---|---|
| 2020/0164112 A1 | 5/2020 | Kato et al. |
| 2020/0238201 A1 | 7/2020 | Minagawa et al. |
| 2020/0346972 A1 | 11/2020 | Eguchi et al. |
| 2021/0101829 A1 | 4/2021 | Minagawa et al. |
| 2021/0372895 A1* | 12/2021 | Minagawa ............ C08F 120/28 |

FOREIGN PATENT DOCUMENTS

| | | | |
|---|---|---|---|
| EP | 3915957 A1 * | 12/2021 | ............ C03C 17/30 |
| EP | 3915957 B1 * | 5/2023 | ............ C03C 17/30 |
| JP | 2005-523981 A | 8/2005 | |
| JP | 2010-65082 A | 3/2010 | |
| JP | 2019-131713 A | 8/2019 | |
| JP | 2019-138838 A | 8/2019 | |
| JP | 2019-138839 A | 8/2019 | |
| JP | 2019-138841 A | 8/2019 | |
| JP | 2020-100062 A | 7/2020 | |
| JP | 2020-115787 A | 8/2020 | |
| JP | 2020-118661 A | 8/2020 | |
| JP | 2021-55035 A | 4/2021 | |
| JP | 2024-91254 A | 7/2024 | |
| WO | WO 03/093357 A1 | 11/2003 | |
| WO | WO 2014/058080 A1 | 4/2014 | |
| WO | WO 2017/065286 A1 | 4/2017 | |
| WO | WO 2018/207586 A1 | 11/2018 | |
| WO | WO 2019/151265 A1 | 8/2019 | |

* cited by examiner

A-A cross-sectional view

A-A cross-sectional view

A-A cross-sectional view

POLYMER-COATED SUBSTRATE AND MEDICAL ANALYSIS DEVICE

TECHNICAL FIELD

The present disclosure relates to a polymer-coated substrate and a medical analysis device.

BACKGROUND ART

A technique of coating the surface of a substrate with a special polymer has been proposed to prepare a device for capturing specific cells (e.g., blood cells, cancer cells present in blood or biological fluid) from blood or biological fluid.

However, for example, when the substrate used is a glass substrate, some special polymer materials do not have high affinity with glass. If such a polymer material not having high affinity is coated, the thus formed polymer film may separate and partially lift or peel off from the glass substrate in a liquid environment such as in water. The lifting or peeling can affect the capturing ability; for example, the coating film may separate after it captures specific cells such as cancer cells. Thus, it is desirable to provide a polymer-coated glass substrate in which a polymer layer formed (coated) on the surface of a glass substrate is stable for a long period of time even in a liquid environment.

SUMMARY OF DISCLOSURE

Technical Problem

The present disclosure aims to solve the above problem and provide a polymer-coated substrate in which a polymer layer formed on the surface of a substrate is stable for a long period of time even in a liquid environment, and a medical analysis device including the polymer-coated substrate.

Solution to Problem

The present disclosure relates to a polymer-coated substrate, including: a substrate; a silane compound layer formed on a surface of the substrate; and a polymer layer formed on the silane compound layer.

Advantageous Effects of Disclosure

As the polymer-coated substrate according to the present disclosure includes a substrate, a silane compound layer formed on a surface of the substrate, and a polymer layer formed on the silane compound layer, the polymer layer is strongly adsorbed and coated on the surface of the substrate even in a liquid environment such as in water, so that lifting or peeling of the polymer layer can be prevented. Thus, the present disclosure provides a polymer-coated substrate in which a polymer layer formed on the surface of a substrate is stable for a long period of time. Accordingly, the polymer-coated substrate is expected to improve the ability to capture specific cells such as cancer cells.

DESCRIPTION OF EMBODIMENTS

The present disclosure provides a polymer-coated substrate including a silane compound layer formed on a surface of a substrate, and further a polymer layer formed on the silane compound layer, or specifically a polymer-coated substrate in which a substrate surface, a silane compound layer, and a polymer layer are stacked in said order (substrate surface->silane compound layer-polymer layer).

The number of tumor cells (cancer cells, etc.) appearing in biological fluid, such as circulating tumor cells (several to hundreds of cells/1 ml of blood), is very small, and it is considered important to capture tumor cells present in the sampled biological fluid as many as possible to analyze them. As the polymer-coated substrate of the present disclosure includes a silane compound layer formed on a surface of a substrate, and further a polymer layer formed on the silane compound layer, the polymer is firmly adsorbed onto the substrate surface so that it is stable for a long period of time and lifting or peeling can be prevented. Then, since the instability such as lifting or peeling of the polymer layer can affect the ability to capture specific cells such as cancer cells, increasing stability (long-term stable coating) is expected to provide an excellent ability to capture specific cells. Thus, it is expected that by counting the number of tumor cells captured onto the polymer layer of the polymer-coated substrate, one can determine the number of tumor cells in biological fluid, e.g., in order to evaluate the cancer-treating effect. Moreover, the captured tumor cells may be cultured and then used to determine the effects of drugs such as anticancer drugs. This allows one to determine the effects of drugs such as anticancer drugs ex vivo before administration, and also helps to screen drugs such as anticancer drugs. Furthermore, genetic analysis of the captured tumor cells helps to screen drugs such as anticancer drugs.

The polymer-coated substrate includes a silane compound layer formed on a surface of a substrate. Examples of the substrate include glass substrates; and resin substrates including acrylic resins (polyacrylic resins) such as polymethyl acrylate, polymethyl methacrylate, polyacrylic acid, and polymethacrylic acid, cycloolefin resins (polycycloolefins), carbonate resins (polycarbonates), styrene resins (polystyrenes), polyester resins such as polyethylene terephthalate (PET), and polydimethylsiloxanes. Glass substrates are preferred among these.

The type of glass of the glass substrates is not limited. Examples include soda lime glass, alkali-free glass, borosilicate glass ($SiO_2$—$B_2O_3$—$ZnO$ glass, $SiO_2$—$B_2O_3$—$Bi_2O_3$ glass, etc.), potash glass, crystal glass (glass containing PbO, such as $SiO_2$—$PbO$ glass, $SiO_2$—$PbO$—$B_2O_3$ glass, $SiO_2$—$B_2O_3$—$PbO$ glass, etc.), titanium crystal glass, barium glass, boron glass ($B_2O_3$—$ZnO$—$PbO$ glass, $B_2O_3$—$ZnO$—$Bi_2O_3$ glass, $B_2O_3$—$Bi_2O_3$ glass, $B_2O_3$—$ZnO$ glass, etc.), strontium glass, alumina silicate glass, soda-zinc glass, and soda-barium glass ($BaO$—$SiO_2$ glass, etc.). These types of glass may be used alone or in admixtures of two or more.

The substrate used may be a metal substrate. Examples of the metal material of the metal substrate include metals such as stainless steel, nickel-titanium alloys, iron, titanium, aluminum, tin, and zinc-tungsten alloys. From the standpoint of biocompatibility, stainless steel and nickel-titanium alloys are preferred among these.

Although the thickness of the substrate is not limited, the average thickness is preferably 0.10 to 5.00 mm, more preferably 0.50 to 3.00 mm, still more preferably 0.80 to 2.00 mm. Here, the term "average thickness" refers to the average of the thicknesses measured at ten arbitrary points using a micrometer.

The silane compound of the silane compound layer is not limited and may be a known silane compound. Examples of the silane compound include silane compounds free from fluoroalkyl groups and silane compounds free from perfluoroether groups. To better achieve the advantageous effect, alkoxysilanes and modified alkoxysilanes are preferred among these, with alkoxysilanes being more preferred. The silane compounds may be used alone or in combinations of two or more.

Examples of the alkoxysilanes include monoalkoxysilanes such as trimethylmethoxysilane, triethylethoxysilane, tripropylpropoxysilane, and tributylbutoxysilane; dialkoxysilanes such as dimethyldimethoxysilane, diethyldiethoxysilane, dipropyldipropoxysilane, and dibutyldibutoxysilane; trialkoxysilanes such as methyltrimethoxysilane, ethyltriethoxysilane, propyltripropoxysilane, and butyltributoxysilane; and tetraalkoxysilanes such as tetramethoxysilane, tetraethoxysilane, tetrapropoxysilane, tetrabutoxysilane, dibutoxydiethoxysilane, butoxytriethoxysilane, and ethoxytriethoxysilane. These may be used alone or in combinations of two or more. To better achieve the advantageous effect, tetraalkoxysilanes are preferred among these, with tetramethoxysilane, tetraethoxysilane, tetrabutoxysilane, dibutoxydiethoxysilane, butoxytriethoxysilane, and ethoxytributoxysilane being more preferred.

Examples of the modified alkoxysilanes include alkoxysilanes containing substituents such as an amino, carboxyl, hydroxy, or epoxy group. Modified alkoxysilanes containing at least one selected from the group consisting of alkyl, amino, carboxyl, hydroxy, and epoxy groups are desirable among these.

To better achieve the advantageous effect, the number of carbon atoms of the alkoxysilanes or modified alkoxysilanes is preferably 4 to 22, more preferably 4 to 16.

To better achieve the advantageous effect, the alkoxysilanes or modified alkoxysilanes each preferably contain at least one selected from the group consisting of methoxy, ethoxy, propoxy, and butoxy groups, more preferably an ethoxy group and/or a butoxy group, still more preferably an ethoxy group and a butoxy group.

Usable commercial silane compounds include Primer coat PC-3B (FLUORO TECHNOLOGY, a butoxy/ethoxy tetraalkoxysilane represented by the following formula).

In the formula, m+n=4 with n>m>0 on average.

A silane compound layer can be formed on a surface of a substrate by any method that can allow a silane compound to contact the substrate surface. Examples include methods in which the silane compound or a solution thereof is applied or sprayed onto the substrate surface, and methods in which the substrate is immersed in the silane compound or a solution thereof. The formed silane compound layer may be subjected to washing, drying, and/or other appropriate processes by known methods. Here, the conditions such as duration and temperature for the application or spraying of the silane compound or a solution thereof to the substrate surface, the immersion of the substrate in the silane compound or a solution thereof, and/or the washing, drying, etc. of the formed silane compound layer may be appropriately selected so that the silane compound layer is adequately formed.

When a silane compound layer is formed on a surface of a substrate as described above or by other methods, the conditions such as duration and temperature may be appropriately selected depending on the type of silane compound, formation method, etc. Preferably, the silane compound layer is formed (e.g., retained) at 50% humidity or higher. This tends to lead to a strong interaction (e.g., chemical bonding) between the substrate surface and the silane compound. The humidity is more preferably 60% or higher, still more preferably 80% or higher. The upper limit is not limited but it is preferably 100% or lower, for example.

The duration and temperature during the formation (e.g., retention) of the silane compound layer may be appropriately selected. For example, the duration (e.g., duration of retention) is preferably 1 to 60 hours, more preferably 1 to 20 hours. The temperature (e.g., retention temperature) is preferably 20 to 120° C., more preferably 25 to 90° C.

The thickness of the silane compound layer (the layer formed from the silane compound) is preferably 10 to 150 nm, more preferably 30 to 120 nm, still more preferably 30 to 100 nm. When the thickness is adjusted within the range indicated above, the advantageous effect tends to be better achieved.

In the polymer-coated substrate, a silane compound layer is formed on a surface of a substrate, and further a polymer layer is formed on the silane compound layer. The polymer layer is formed from a polymer.

The polymer of the polymer layer may be an appropriate known polymer.

Examples include homopolymers of single monomers and copolymers of two or more monomers. The polymers may be used alone or in combinations of two or more. Polymers having hydrophilicity (hydrophilic polymers) are desirable among the polymers.

Examples of the hydrophilic polymers include homopolymers or copolymers of one or two or more hydrophilic monomers, and copolymers of one or two or more hydrophilic monomers and one or two or more additional monomers.

The hydrophilic monomers of the homopolymers or copolymers are not limited, and examples include various monomers containing hydrophilic groups. Examples of the hydrophilic groups include known hydrophilic groups such as an amide group, a sulfuric acid group, a sulfonic acid group, a carboxylic acid group, a hydroxy group, an amino group, and an oxyethylene group.

Specific examples of the hydrophilic monomers include (meth)acrylic acids, (meth)acrylic acid esters (e.g., alkoxyalkyl (meth)acrylates such as methoxyethyl (meth)acrylates, and hydroxyalkyl (meth)acrylates such as hydroxyethyl (meth)acrylates), (meth)acrylamides, and (meth)acrylamide derivatives containing cyclic groups (e.g., (meth)acryloylmorpholines). Preferred among these are (meth)acrylic acids, (meth)acrylic acid esters, and alkoxyalkyl (meth)acrylates. Alkoxyalkyl (meth)acrylates are more preferred, and 2-methoxyethyl acrylate is particularly preferred.

The additional monomers of the copolymers may be appropriately selected as long as they do not inhibit the advantageous effect of the hydrophilic polymers. Examples include aromatic monomers such as styrene, vinyl acetate, and N-isopropylacrylamide which can impart temperature responsiveness.

Specific examples of the homopolymers and copolymers include: homopolymers formed from single hydrophilic monomers, such as polyacrylic acids, polyacrylic acid esters, polymethacrylic acids, polymethacrylic acid esters, polyacryloylmorpholines, polymethacryloylmorpholines, polyacrylamides, polymethacrylamides, polyalkoxyalkyl acrylates, and polyalkoxyalkyl methacrylates; copolymers formed from two or more hydrophilic monomers as listed above; and copolymers formed from one or more hydrophilic monomers as listed above and one or more additional monomers as listed above. The hydrophilic polymers may be used alone or in combinations of two or more.

Preferred among the hydrophilic polymers is at least one selected from the group consisting of polymers represented by the following formula (I):

(I)

wherein $R^{51}$ represents a hydrogen atom or a methyl group; $R^{52}$ represents an alkyl group; p represents 1 to 8; m represents 1 to 5; and n represents the number of repetitions.

Suitable examples of the polymers of formula (I) include polymers represented by the following formula (I-1):

(I-1)

wherein $R^{51}$ represents a hydrogen atom or a methyl group; $R^{52}$ represents an alkyl group; m represents 1 to 5; and n represents the number of repetitions.

The number of carbon atoms of the alkyl group for $R^{52}$ is preferably 1 to 10, more preferably 1 to 5. In particular, $R^{52}$ is particularly preferably a methyl group or an ethyl group. The symbol p is preferably 1 to 5, more preferably 1 to 3. The symbol m is preferably 1 to 3. The symbol n (the number of repeating units) is preferably 15 to 1500, more preferably 40 to 1200.

Other suitable examples of the hydrophilic polymers include copolymers of at least one hydrophilic monomer selected from the group consisting of compounds represented by the following formula (II) with additional monomers.

(II)

In the formula, $R^{51}$, $R^{52}$, p, and m are as defined above.

Suitable examples of the compounds of formula (II) include compounds represented by the following formula (II-1).

(II-1)

In the formula, $R^{51}$, $R^{52}$, and m are as defined above.

To better achieve the advantageous effect, the hydrophilic polymers of formula (I) are preferred among the above-mentioned hydrophilic polymers, with the hydrophilic polymers of formula (I-1) being particularly preferred.

To better achieve the advantageous effect, the number average molecular weight (Mn) of the polymer is preferably 8000 to 150000, more preferably 10000 to 60000, still more preferably 12000 to 50000. The number average molecular weight as indicated above is also desirable when the polymer is a hydrophilic polymer.

Herein, Mn can be determined by gel permeation chromatography (GPC) (GPC-8000 series available from Tosoh Corporation, detector: differential refractometer, column: TSKgel SuperMultipore HZ-M available from Tosoh Corporation) calibrated with polystyrene standards.

The thickness of the polymer layer (the layer formed from the polymer) is preferably 10 to 1000 nm, more preferably 30 to 700 nm, still more preferably 50 to 350 nm. When the thickness is adjusted within the range indicated above, the advantageous effect tends to be better achieved.

Here, the thickness (film thickness) as indicated above is also desirable when the polymer layer is a hydrophilic polymer layer (a layer formed from a hydrophilic polymer).

The surface of the polymer layer (the surface of the polymer layer of the polymer-coated substrate) preferably at least partially (partially or entirely) has a water contact angle of not larger than 60 degrees, more preferably not larger than 50 degrees.

A polymer-coated substrate in which a polymer layer is formed entirely or partially on a silane compound layer can be prepared by known techniques, such as 1) by dissolving or dispersing a polymer in any solvent to prepare a polymer solution or dispersion, injecting the polymer solution or dispersion onto a substrate (e.g., the recess of the substrate) having a silane compound layer formed thereon, and retaining and drying it for a predetermined time, or 2) by applying (spraying) the polymer solution or dispersion to the silane compound layer formed on the substrate surface, optionally followed by drying. Then, the polymer-coated substrate may be combined with other components as needed to prepare a device capable of, for example, capturing, culturing, and/or analyzing specific cells.

Conventionally known materials or methods are applicable as the solvent, injection method, application (spraying) method, etc.

The duration of retention/drying in the method 1) or 2) may be appropriately selected depending on the size of the substrate, the type of liquid introduced, etc. The duration of retention is preferably 10 seconds to 10 hours, more preferably 1 minute to 5 hours, still more preferably 5 minutes to 2 hours. The drying is preferably performed at room temperature (about 23° C.) to 80° C., more preferably at room temperature to 60° C. Moreover, the drying may be performed under reduced pressure. Furthermore, after a predetermined time of retention, the excess polymer solution or dispersion may be discharged as appropriate before drying.

The solvent may be any solvent that can dissolve a polymer and may be appropriately selected depending on the polymer used. For example, the solvent may be water, an organic solvent, or a mixture thereof. Examples of the organic solvent include alcohols such as methanol, ethanol, n-propanol, i-propanol, and methoxypropanol; ketones such as acetone and methyl ethyl ketone; tetrahydrofuran, acetonitrile, ethyl acetate, and toluene.

The concentration of the polymer solution or dispersion is not limited and may be appropriately selected in view of injection, application, or spraying properties, productivity, etc. The polymer concentration of the polymer solution or dispersion (100% by mass) is preferably 0.1 to 10.0% by mass, more preferably 0.15 to 5.0% by mass.

The polymer layer may have a scaffold protein adsorbed onto a surface thereof. The further adsorption of a scaffold protein to a surface of the polymer layer will result in improved capture of specific cells such as cancer cells.

Herein, the term "scaffold protein" refers to a protein that has the function of promoting selective capture of these specific cells, such as, for example, a protein that has the function of specifically binding to a protein appearing on the surface of the specific cells. The term also refers to a protein that has the function of interacting with (e.g., adsorbing to, binding to, or associating with) the polymer of the polymer layer, such as, for example, a protein which may adsorb to the polymer to mediate the function of promoting selective capture of the specific cells to the surface of the polymer.

The scaffold protein desirably has an arginine-glycine-aspartate (RGD) sequence. Suitable examples of the scaffold protein include fibronectin.

The scaffold protein may be adsorbed onto the polymer layer by any known method. For example, the scaffold protein may be adsorbed onto the polymer layer by contacting the polymer layer with a buffer solution (e.g., phosphate buffered saline (PBS)) of the scaffold protein by a known method, and leaving them at a predetermined temperature for a predetermined time, optionally followed by washing. The temperature and time may be selected as appropriate, and may be, for example, about 10 to 60° C. and about 0.1 to 24 hours, respectively.

From the standpoint of adsorbing the scaffold protein onto the polymer layer, it is suitable to use, for example, a solution or dispersion having a scaffold protein concentration preferably adjusted to 0.5 to 500 μg/ml, more preferably 1 to 250 μg/ml. With a scaffold protein concentration adjusted within the range indicated above, excellent capture of specific cells such as cancer cells can be achieved. Here, the range as indicated above is also desirable for the fibronectin concentration.

The polymer layer in the polymer-coated glass substrate of the present disclosure is strongly adsorbed and coated on the surface of the substrate even in a liquid environment such as in water, so that lifting or peeling of the polymer layer can be prevented and the polymer layer formed on the surface of the substrate can be stable for a long period of time.

Then, as the surface smoothness of the polymer layer is expected to contribute to capture of specific cells such as cancer cells, such a capturing effect can be achieved, for example, by contacting a sample (blood or biological fluid) with the polymer-coated substrate in which the polymer layer is formed. Thus, it is expected that by counting the number of captured specific cells, one can determine the number of specific cells in the sampled blood or biological fluid, e.g., in order to evaluate the cancer-treating effect.

The polymer-coated substrate may be suitably used in a medical analysis device.

Exemplary preferred embodiments of such medical analysis devices will be described below with reference to the drawings.

Figure 2A:
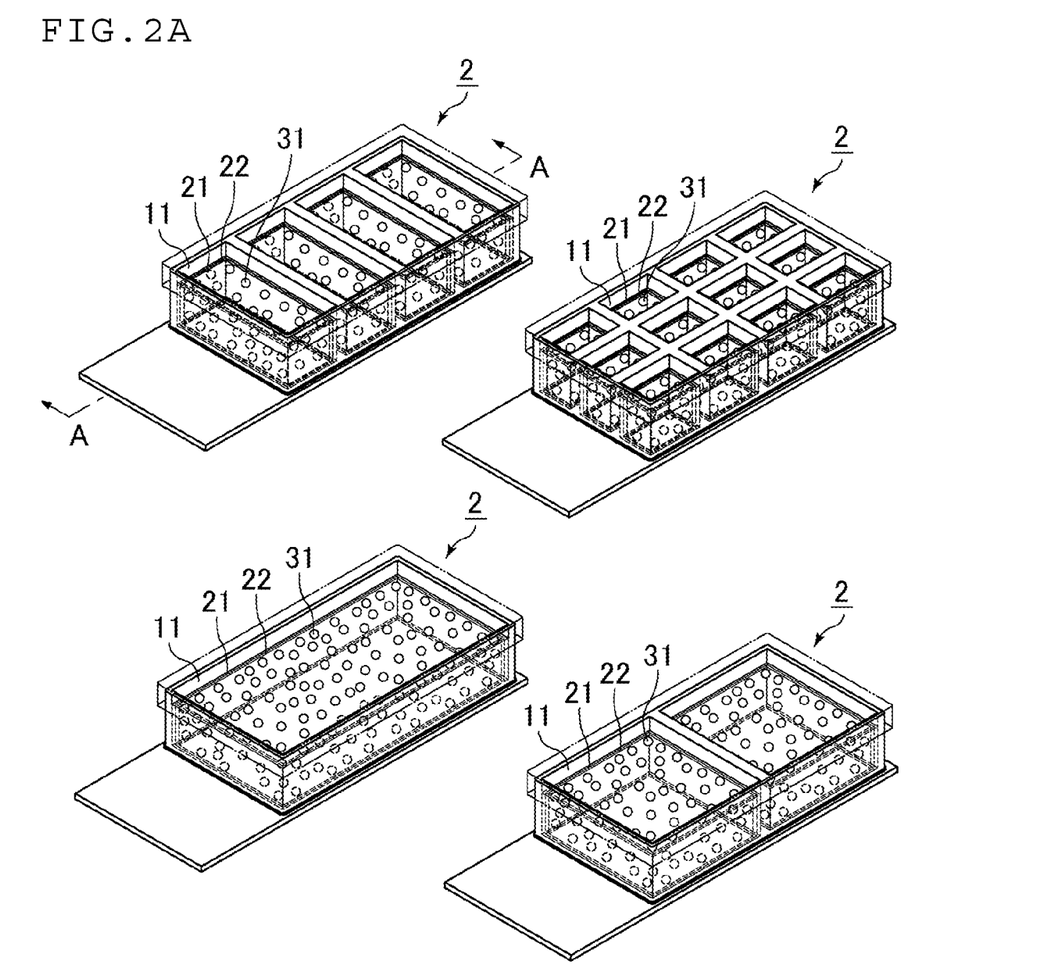
FIG. 2A and FIG. 2B show exemplary schematic views of medical analysis devices (chamber slides).
Figure 2B:
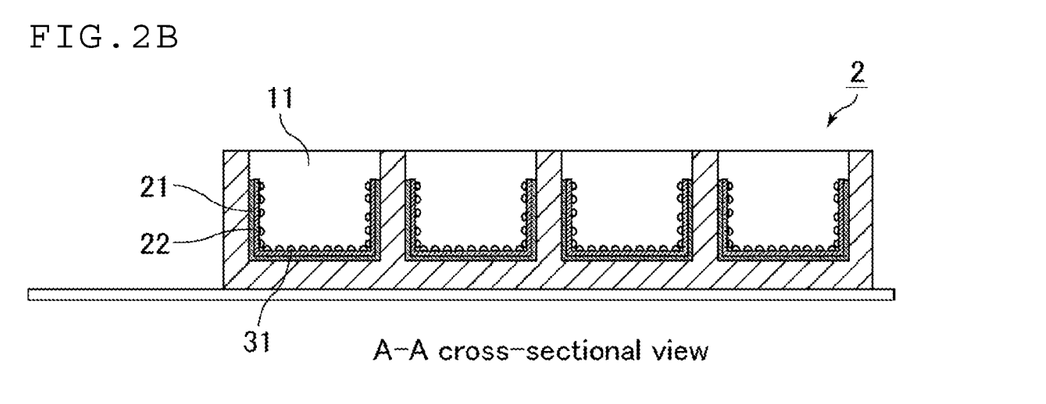
Figure 3A:
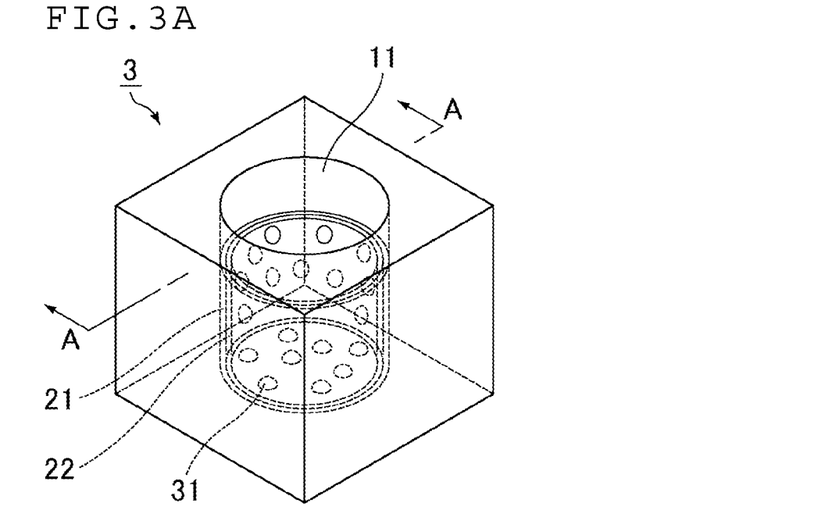
FIG. 3A and FIG. 3B show exemplary schematic views of a medical analysis device (single well).
Figure 3B:
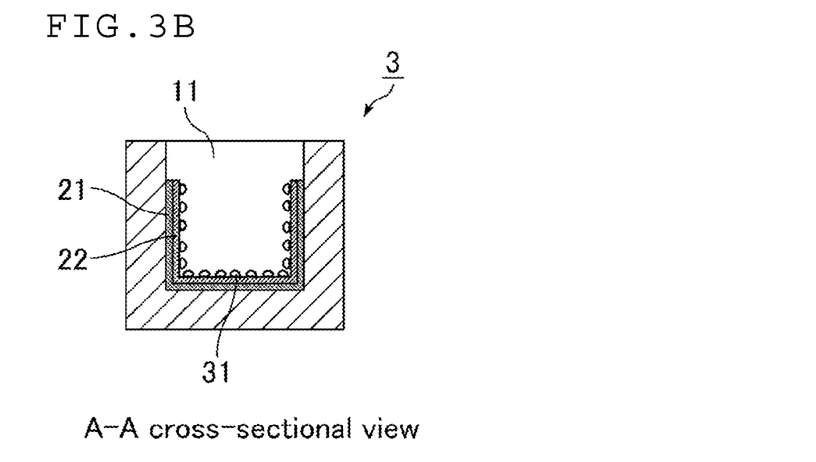

Examples of medical analysis devices include devices using a multi-well plate (FIG. 1A: perspective view, FIG. 1B: cross-sectional view), a chamber slide (FIG. 2A: perspective view, FIG. 2B: cross-sectional view), or a single well (dish, FIG. 3A: perspective view, FIG. 3B: cross-sectional view). These devices may be used to capture specific cells such as cancer cells or stem cells.

Figure 1A:
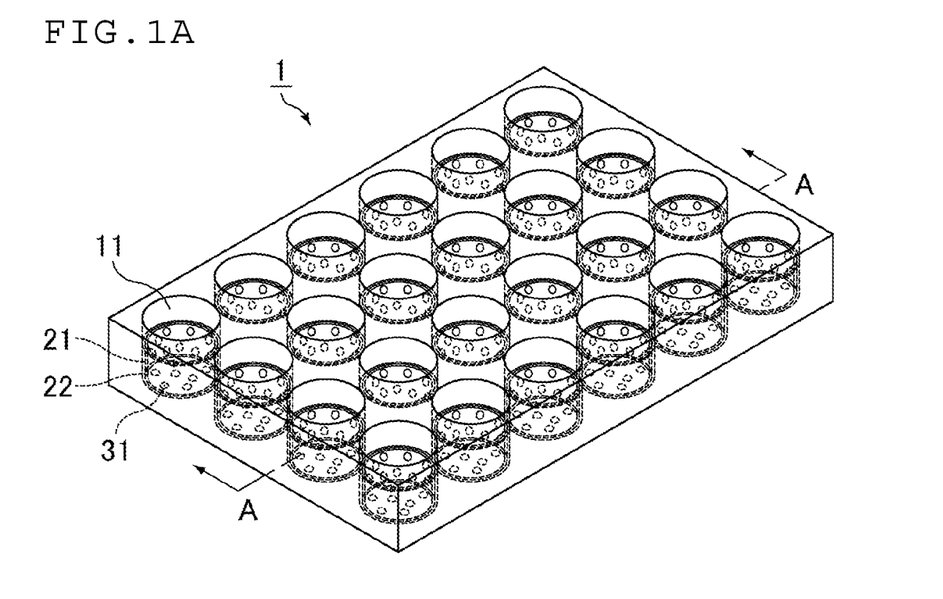
FIG. 1A and FIG. 1B show exemplary schematic views of a medical analysis device (multi-well plate).

An exemplary medical analysis device using a multi-well plate includes a multi-well plate 1 in which wells 11 are arranged in a matrix form as shown in FIG. 1A. The multi-well plate 1 has a plurality of wells 11 having a circular opening. An exemplary medical analysis device using a chamber slide includes a chamber slide 2 as shown in FIG. 2A. The chamber slide 2 is configured to include, on a substrate of a material such as glass, a chamber into which a sample (e.g., blood, biological fluid) may be injected, and has a rectangular well(s) 11. An exemplary medical analysis device using a single well (dish) includes one well 11 (single well 3) as shown in FIG. 3A.

Each well 11 is a recess into which blood, biological fluid, etc. may be injected, and can be used to confirm the presence or absence of specific cells in the injected blood or biological fluid, count the number of specific cells, culture the specific cells, determine the effects of drugs, and/or screen the drugs.

Although FIG. 1A shows an exemplary 24-well plate having 24 wells 11 arranged in 4 rows by 6 columns, it is sufficient for the multi-well plate 1 to have at least two wells 11, and any number of wells 11 may be provided. Examples other than the 24-well plate include general multi-well plates in which the number of wells 11 is 6, 96, 384, etc. FIG. 2A shows an exemplary chamber slide with one well (single well) and exemplary chamber slides with two, four, or 12 separate wells.

Examples of the structural materials of the multi-well plate 1, chamber slide 2, and single well (dish) 3 in the medical analysis devices include the materials of the above-mentioned substrates (glass substrates, resin substrates, metal substrates).

Each well 11 is a blind hole which is provided in the multi-well plate 1, chamber slide 2, single well 3, or other form and has an opening. Blood or biological fluid may be injected through the opening into the well 11. Moreover, if the presence of specific cells such as cancer cells or stem cells is confirmed, a culture fluid for culturing the specific cells may also be injected.

The size of the opening of each well 11 is not limited and may correspond to the diameter R and depth D of a conventional multi-well plate 1 or single well (dish) 3 or the length X, width Y, and depth D of a conventional chamber slide 2. Although in FIG. 1A, FIG. 2A, and FIG. 3A, the inner side surface of each well 11 is substantially vertical to the opposite faces of the plate of the multi-well plate 1 or of the slide of the chamber slide 2, or the bottom of the single well 3, the inner side surface of each well 11 may be inclined to taper from the opening to the bottom. Alternatively, the inner side surface may be inclined to flare out from the opening to the bottom.

Although the wells 11 in FIG. 1A, FIG. 2A, and FIG. 3A have a circular or rectangular opening, the openings of the wells 11 may be in any shape (e.g., triangle, oval) that allows a sample to be introduced therethrough.

The multi-well plate 1 or chamber slide 2 may be one in which a plurality of wells 11 are separable. In the case where a plurality of wells are provided, they may be separated into and used as wells for counting the number of specific cells and for culturing the specific cells. For example, the presence or absence of cancer cells may first be confirmed in the counting wells, and if the presence is confirmed, the cancer cells may be cultured in the culturing wells and then used to determine the effects of drugs.

In the multi-well plate 1, chamber slide 2, single well (dish) 3, or other form of the medical analysis device, a silane compound layer and a polymer layer are formed in said order at least partially on the inner surface of each well 11. From the standpoint of the advantageous effect, a scaffold protein such as fibronectin is preferably adsorbed onto the polymer layer in the medical analysis device.

Figure 1B:
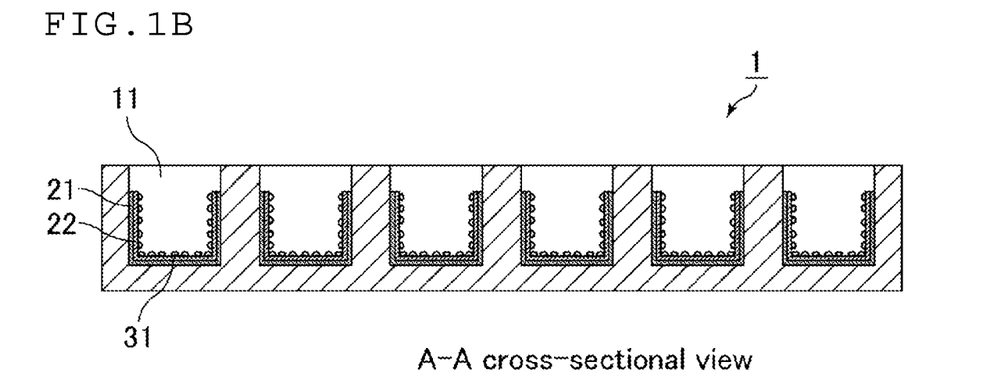

FIGS. 1A and 1B show an example in which a silane compound layer 21 and a polymer layer 22 are formed on a multi-well plate 1, and further a scaffold protein 31 is adsorbed onto the polymer layer 22. Similarly, the chamber slide 2 shown in FIGS. 2A and 2B and the single well (dish) 3 shown in FIGS. 3A and 3B are examples in which a silane compound layer 21 and a polymer layer 22 are formed, and further a scaffold protein 31 is adsorbed onto the polymer layer 22.

Once blood or biological fluid is introduced into the well 11 where a silane compound layer 21 and a polymer layer 22 are formed in said order and a scaffold protein 31 is optionally adsorbed onto the polymer layer 22, specific cells such as cancer cells or stem cells present in the blood or biological fluid may be adsorbed onto the polymer layer 22 while reducing adsorption of other cells such as platelets and erythrocytes. Thus, the specific cells can be adsorbed onto the polymer layer 22 by retaining the introduced blood or biological fluid for a predetermined time, followed by washing. Then, it is expected that by counting the number of adsorbed specific cells, one can determine the number of cancer cells in the blood or biological fluid, e.g., in order to evaluate the cancer-treating effect.

The medical analysis device of the present disclosure can be produced, for example, by preparing a multi-well plate 1, chamber side 2, single well (dish) 3, or other form including a well(s) 11 in which a silane compound layer 21 and a polymer layer 22 are formed in said order on the inner surface and a scaffold protein 31 is optionally adsorbed onto the polymer layer 22, optionally followed by addition of other components (parts).

EXAMPLES

Examples (working examples) which are considered preferable to implement the disclosure are described below, but the scope of the present disclosure is not limited to the examples.

(Preparation of Hydrophilic Polymer)

Using a solution of azobisisobutyronitrile (AIBN) in toluene (12.5 mg/mL), 2-methoxyethyl acrylate (25 wt % toluene) is thermally polymerized at 60° C. for seven hours to prepare poly(2-methoxyethyl acrylate) (PMEA, Mn: 17000).

Examples 1 to 4

A silane compound (Primer Coat PC-3B, FLUORO TECHNOLOGY, a butoxy/ethoxy tetraalkoxysilane represented by the above formula) is added to a chamber slide (bottom: soda lime glass, average thickness: 1.35 mm) and left for one hour. Then, after drawing out the silane compound, the chamber slide is left at 40° C. for one hour at 90% humidity, followed by vacuum drying at 80° C. for reaction.

Next, a solution of PMEA in methanol having the concentration indicated in Table 1 is injected onto the silane compound layer formed as above. Immediately thereafter, the chamber slide is vacuum dried in an oven at 40° C. for 5 minutes (coating step) to form a polymer layer, thereby preparing a polymer-coated substrate.

Example 5

A silane compound (Primer Coat PC-3B, FLUORO TECHNOLOGY, a butoxy/ethoxy tetraalkoxysilane represented by the above formula) is added to a chamber slide (bottom: soda lime glass, average thickness: 1.35 mm) and left for one hour. Then, after drawing out the silane compound, the chamber slide is left at 40° C. for one hour at 90% humidity, followed by vacuum drying at 80° C. for reaction.

Next, a 0.25% by mass solution of PMEA in methanol is injected onto the silane compound layer formed as above. Immediately thereafter, the chamber slide is vacuum dried in an oven at 40° C. for 5 minutes (coating step).

Subsequently, fibronectin is adsorbed onto the surface of the polymer layer formed as above. Specifically, a 50 µg/ml solution of fibronectin in phosphate buffered saline (PBS) is prepared and left on the surface at 37° C. for five hours, thereby preparing a polymer-coated substrate.

Comparative Example 1

A 0.25% by mass solution of PMEA in methanol is injected into a chamber slide (bottom: soda lime glass, average thickness: 1.35 mm), immediately followed by vacuum drying in an oven at 40° C. for 5 minutes (coating step), thereby preparing a polymer-coated substrate.

[Thicknesses of Silane Compound Layer and Polymer Layer]

The thicknesses (film thicknesses) of the silane compound layer and polymer layer formed in each polymer-coated substrate are determined by measuring (photographing) a cross-section of the formed silane compound layer or polymer layer using a TEM at an acceleration voltage of 15 kV and a magnification of 1000×.

[Evaluation of Peeling of Polymer Layer in PBS]

The polymer-coated substrates prepared as above are immersed in phosphate buffered saline (PBS), and peeling is observed after 1 hour, 24 hours, and 48 hours.

TABLE 1

| | Example 1 | Example 2 | Example 3 | Example 4 | Example 5 | Comparative Example 1 |
|---|---|---|---|---|---|---|
| Concentration of PMEA methanol solution (% by mass) | 0.15% | 0.25% | 0.5% | 1% | 0.25% | 0.25% |

TABLE 1-continued

| | | Example 1 | Example 2 | Example 3 | Example 4 | Example 5 | Comparative Example 1 |
|---|---|---|---|---|---|---|---|
| Thickness of silane compound layer (nm) | | 76 | 76 | 73 | 77 | 75 | — |
| Thickness of polymer layer (nm) | | 184 | 314 | 581 | 958 | 332 | 355 |
| Evaluation of peeling of polymer layer in PBS | After 1 hour | no peeling | no peeling | no peeling | no peeling | no peeling | partially swollen |
| | After 24 hours | no peeling | no peeling | no peeling | no peeling | no peeling | swelling increased |
| | After 48 hours | no peeling | no peeling | no peeling | very partially swollen | no peeling | peeled |

When Comparative Example 1 is immersed in PBS, the polymer layer swells over time and finally peels off.

In contrast, in Example 4, the polymer layer is very partially swollen after 48 hours, but there is no practical problem because capturing specific cells such as cancer cells is not conducted for as long as 48 hours. In Examples 1 to 3 and 5, the respective polymer layers are not swollen even after 48 hours.

Exemplary embodiments of the present disclosure include:

Embodiment 1. A polymer-coated substrate, including:
a substrate;
a silane compound layer formed on a surface of the substrate; and
a polymer layer formed on the silane compound layer.

Embodiment 2. The polymer-coated substrate according to Embodiment 1,
wherein the polymer layer is formed of at least one selected from the group consisting of polymers represented by the following formula (I):

(I)

wherein $R^{51}$ represents a hydrogen atom or a methyl group; $R^{52}$ represents an alkyl group; p represents 1 to 8; m represents 1 to 5; and n represents the number of repetitions.

Embodiment 3. The polymer-coated substrate according to Embodiment 1,
wherein the polymer layer is formed of a copolymer of at least one hydrophilic monomer selected from the group consisting of compounds represented by the following formula (II) with an additional monomer:

(II)

wherein $R^{51}$ represents a hydrogen atom or a methyl group; $R^{52}$ represents an alkyl group; p represents 1 to 8; m represents 1 to 5; and n represents the number of repetitions.

Embodiment 4. The polymer-coated substrate according to any one of Embodiments 1 to 3,
wherein the polymer layer is formed of a polymer having a number average molecular weight of 8000 to 150000.

Embodiment 5. The polymer-coated substrate according to any one of Embodiments 1 to 4,
wherein the polymer layer has a thickness of 10 to 1000 nm.

Embodiment 6. The polymer-coated substrate according to any one of Embodiments 1 to 5,
wherein the polymer layer has a scaffold protein adsorbed onto a surface thereof.

Embodiment 7. The polymer-coated substrate according to Embodiment 6,
wherein the scaffold protein is fibronectin.

Embodiment 8. The polymer-coated substrate according to any one of Embodiments 1 to 7,
wherein the silane compound is an alkoxysilane.

Embodiment 9. The polymer-coated substrate according to any one of Embodiments 1 to 8,
wherein the silane compound layer has a thickness of to 150 nm.

Embodiment 10. The polymer-coated substrate according to any one of Embodiments 1 to 9,
wherein the substrate is a glass substrate.

Embodiment 11. A medical analysis device, including the polymer-coated substrate according to any one of Embodiments 1 to 10.

REFERENCE SIGNS LIST 1 multi-well plate
2 chamber slide
3 single well (dish)
11 well
21 silane compound layer
22 polymer layer
31 scaffold protein

The invention claimed is:
1. A polymer-coated substrate, comprising:
a substrate;
a silane compound layer formed on a surface of the substrate; and
a polymer layer formed on the silane compound layer,
wherein the polymer layer is formed of:
(i) at least one selected from the group consisting of polymers represented by the following formula (I):

(I)

where $R^{51}$ represents a hydrogen atom or a methyl group; $R^{52}$ represents an alkyl group; p represents 1 to 8; m represents 1 to 5; and n represents the number of repetitions and n is 15 to 1500, or (ii) a copolymer of at least one hydrophilic monomer selected from the group consisting of compounds represented by the following formula (II) with an additional monomer:

(II)

wherein $R^{51}$ represents a hydrogen atom or a methyl group; $R^{52}$ represents an alkyl group; p represents 1 to 8; and m represents 1 to 5.

2. The polymer-coated substrate according to claim 1, wherein the polymer layer has a thickness of 10 to 1000 nm.

3. The polymer-coated substrate according to claim 1, wherein the polymer layer has a scaffold protein adsorbed onto a surface thereof.

4. The polymer-coated substrate according to claim 3, wherein the scaffold protein is fibronectin.

5. The polymer-coated substrate according to claim 1, wherein the silane compound is an alkoxysilane.

6. A medical analysis device, comprising the polymer-coated substrate according to claim 1.

* * * * *